United States Patent [19]
Srivastava

[11] 3,962,723
[45] June 8, 1976

[54] AUTOMATIC PEAK COLOR CONTROL CIRCUIT

[75] Inventor: Gopal Krishna Srivastava, Amherst, N.Y.

[73] Assignee: GTE Sylvania Incorporated, Stamford, Conn.

[22] Filed: July 15, 1974

[21] Appl. No.: 488,807

Related U.S. Application Data

[63] Continuation of Ser. No. 409,655, Oct. 25, 1973, abandoned.

[52] U.S. Cl. ............................................. 358/27
[51] Int. Cl.² ....................................... H04N 9/535
[58] Field of Search .............. 358/27, 36; 178/7.3 R, 178/7.3 DG, DIG. 12

[56] References Cited
UNITED STATES PATENTS

| | | | |
|---|---|---|---|
| 3,571,499 | 3/1971 | Hansen et al. | 358/27 |
| 3,708,613 | 1/1973 | Nakabe et al. | 358/27 |
| 3,732,358 | 5/1973 | Harwood | 358/27 |
| 3,740,462 | 6/1973 | Harwood | 358/27 |
| 3,764,734 | 10/1973 | Srivastava | 358/27 |

*Primary Examiner*—John C. Martin
*Attorney, Agent, or Firm*—Norman J. O'Malley; Thomas H. Buffton; Robert T. Orner

[57] ABSTRACT

In a television receiver having a chrominance signal channel coupled to a cathode ray tube, an automatic peak color control circuit includes an envelope detector means providing a combined chroma envelope and DC potential, a means for shifting the level of the combined chroma envelope and DC potential, a means for detecting the peak level of the chroma signal, and a means for comparing the detected peak chroma signal level and a reference potential level to provide a control signal for maintaining application of a substantially constant level of chroma signal to the cathode ray tube.

26 Claims, 7 Drawing Figures

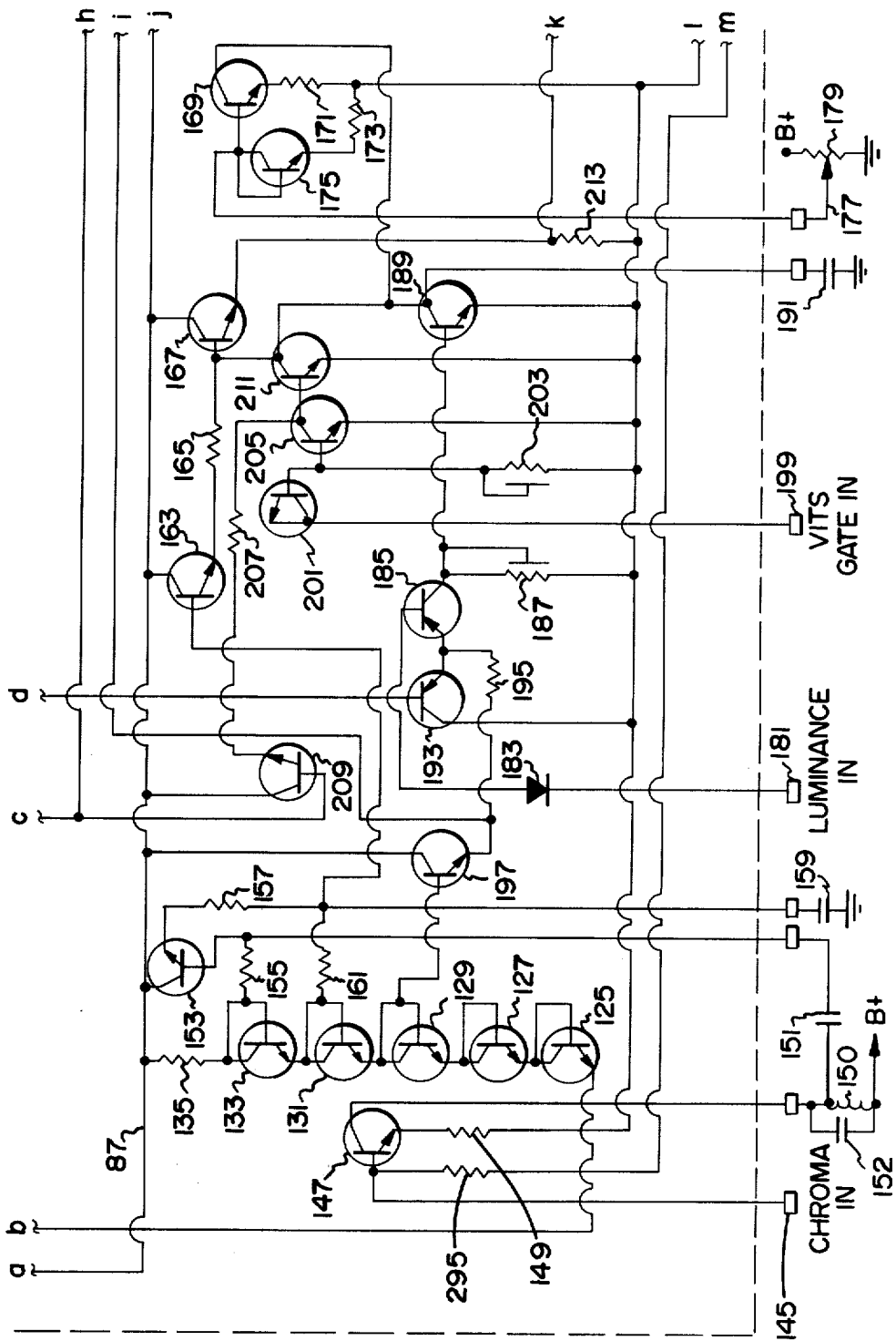

AUTOMATIC PEAK COLOR CONTROL CIRCUIT

CROSS-REFERENCE TO OTHER APPLICATIONS

This application is a Continuation application of an application entitled "Automatic Peak Color Control Circuit" bearing U.S. Ser. No. 409,655, filed Oct. 25, 1973, now abandoned, in the name of Gopal Krishna Srivastava and assigned to the assignee of the present application.

A co-pending application, U.S. Ser. No. 381,251, filed July 20, 1973, now U.S. Pat. No. 3,882,534, in the name of Applicant relates to an automatic tint control circuit whereby flesh tones are enhanced. Also, an application U.S. Ser. No. 260,660, filed June 7, 1972 now U.S. Pat. No. 3,764,734, in the name of Gopal Krishna Srivastava et al. relates to an automatic peak color control system employing average and threshold detectors in combination.

BACKGROUND OF THE INVENTION

In the field of color television, undesired variations in television receiver reception is frequently due to variations in the signals provided for reception. Normally, undesired signal variations are either of the form wherein both color burst and chroma signals simultaneously vary or of the type wherein the ratio of color burst to chroma signals undesirably varies.

In the first instance, simultaneous burst and chroma variations are frequently due to either the signal as broadcast or to a multipath propogation of the broadcast signal. In the second instance, color burst to chroma signal ratio variations are usually due either to deterioration of the signal ratio in the broadcast apparatus or to re-insertion of the color burst signal by a local station.

As to minimization of the simultaneous color burst and chroma variations, an automatic chroma control (ACC) is usually employed in a manner such that the chroma level is automatically varied in accordance with variations in the color burst signal. While such a system provides a desirable result for simultaneous color burst and chroma signal variations, it can be readily understood that the adjustments obtainable therefrom are highly undesirable when the ratio of the color burst to chroma signal undesirably varies. Factually, such corrective circuitry is deleterious and magnifies rather than reduces the undesired errors when the variations are concerned with the ratio of the color burst to chroma signal.

One known attempt to remedy the undesired variations in reception due to a shift in the color burst to chroma signal ratio includes the use of an average detector system to control the gain of a color amplifier stage. However, average detection does not maintain the desired peak values of chroma signal whereupon an undesired "washed-out" or an over-saturated condition is obtained.

In another known technique, undesired color burst to chroma signal ratio variations are applied to circuitry which utilizes both average and threshold detectors. As set forth in the above-mentioned application, Ser. No. 260,660, the average and threshold detectors track in a manner such that a substantially constant value of chroma is provided regardless of the type of scene viewed.

Although the above-mentioned circuitry has been and still is employed to improve television receiver reception, it has been found that there still exists room for enhanced signal reception. In other words, noise-free reception of signals truly representative of peak chroma signals with inexpensive circuitry employing a reduced number of discrete components is an obviously desirable goal.

OBJECTS AND SUMMARY OF THE INVENTION

An object of the present invention is to provide an enhanced color television receiver. Another object of the invention is to provide circuitry for maintaining a substantially constant peak signal level despite variations in the color burst to chroma signal ratio. Still another object of the invention is to provide substantially noise-free peak detection of chroma in a received signal. A still further object of the invention is to provide a gated vertical interval test signal means in conjunction with an automatic peak color control circuit for a television receiver. An additional object of the invention is to provide an automatic peak color control circuit which includes a signal sensing means whereby detection of a decreasing chroma signal is translated in a manner whereby an image result observed by a viewer has a reduced chroma content.

These and other objects, advantages and capabilities are achieved in one aspect of the invention by an automatic peak color control circuit wherein a signal provided by a chrominance amplifier stage is envelope detected, level shifted, peak detected, and compared with a reference potential to provide a differential signal for controlling the gain of the chrominance amplifier stage.

In another aspect of the invention, a sensing means detects a decrease in chroma content of a signal, compares the decreased chroma content with a reference potential, and provides an output for altering the control signal applied to the chrominance amplifier stage. Moreover, provision is made for inhibiting undesired variations of the peak detected signal due to noise signals and for gating the system to remove or gate a vertical interval test signal.

BRIEF DESCRIPTION OF THE DRAWINGS

FIGS. 2A, 2B, and 2C set forth a schematic illustration of a preferred form of automatic peak color control circuitry employed in the color television receiver of FIG. 1.

DESCRIPTION OF THE PREFERRED EMBODIMENT

For a better understanding of the present invention, together with other and further objects, advantages and capabilities thereof, reference is made to the following disclosure and appended claims in connection with the accompanying drawings.

Figure 1:
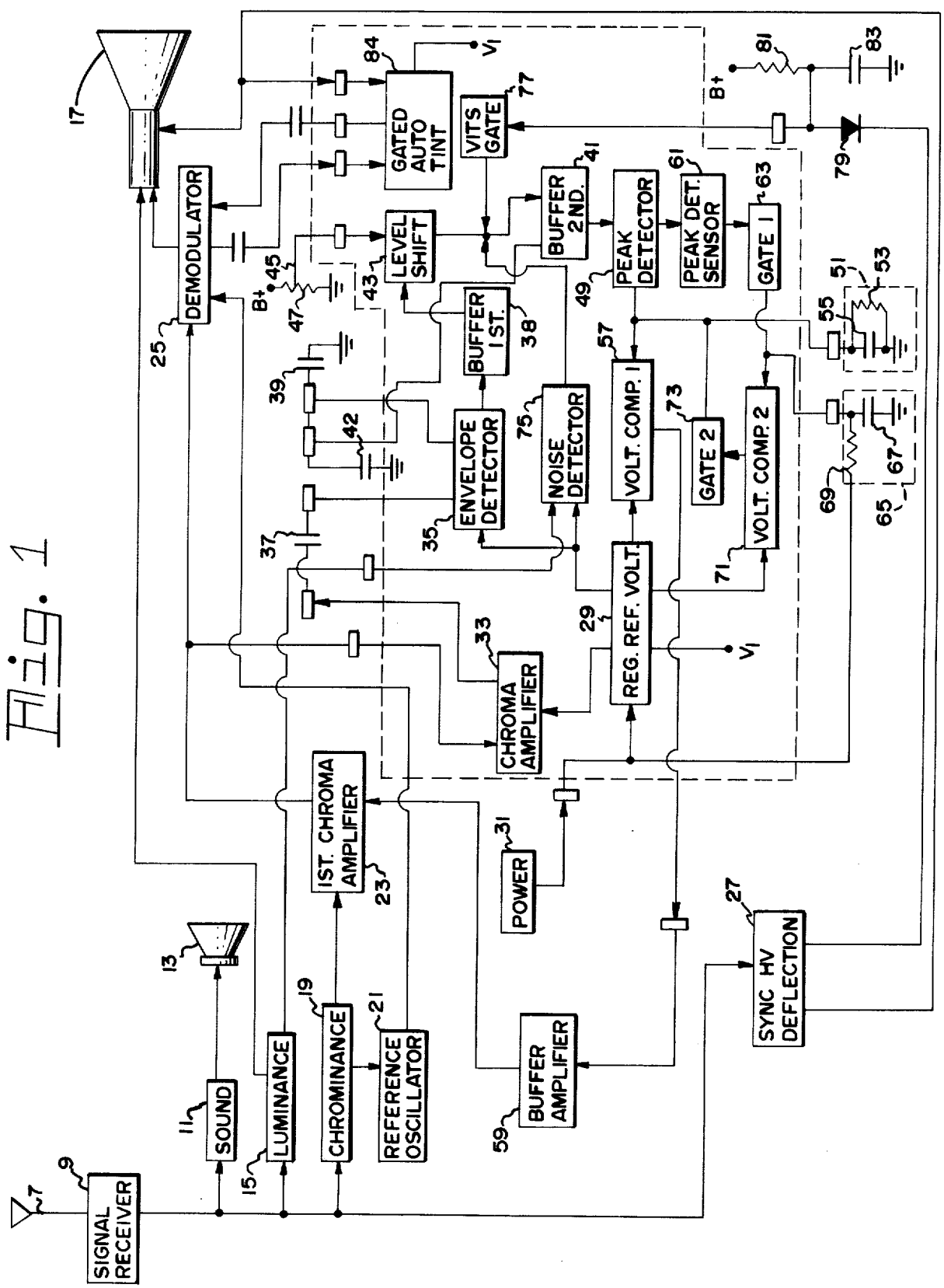
FIG. 1 is an illustration, in block and schematic form, of a color television receiver employing a preferred embodiment of the invention.

In the drawings, FIG. 1 illustrates a color television receiver having an antenna 7 for intercepting and applying color television signals to a signal receiver 9. The signal receiver 9 includes the usual RF and IF amplifier, detector, and mixer stages and provides a first output which is applied to a sound channel 11 coupled to a loudspeaker 13.

A second output from the receiver 9 is applied to a luminance channel 15 wherein signals representative of image information are derived and applied to an image reproducer or cathode ray tube 17. Another output from the receiver 9 is applied to a chrominance channel 19 which is, in turn, coupled to a reference oscillator stage 21 and to a first chrominance amplifier stage 23. The oscillator and first chrominance amplifier stages 21 and 23 provide signals for a demodulator means 25 wherein signals representative of color information are derived and applied to the cathode ray tube 17.

Also, an output signal from the first chrominance amplifier stage 23 is applied to an automatic peak color control circuit which provides a signal for controlling the gain of the first chrominance amplifier stage 23. The peak color control circuit is preferably in the form of a monolithic integrated circuit disposed on a semiconductor chip.

More specifically, the automatic peak color control circuit includes a source of regulated reference potential 29 coupled to a power source 31 and to a chrominance signal amplifier stage 33 connected to the output of the first chrominance amplifier stage 23. An envelope detector means 35 for detecting the positive modulation envelope is connected to the reference potential source 29 and coupled by way of an external capacitor 37 to the output of the chrominance signal amplifier stage 33.

The envelope detector 36 having an external capacitor 39 connected to circuit ground is coupled to a first buffer amplifier stage 38. The first buffer amplifier stage 38 is connected to a potential level shifting stage 43, which is connected to the second buffer amplifier stage 41 and to the adjustable arm 45 of a variable resistor 47 connected intermediate a potential source B+ and circuit ground. The input of the second buffer amplifier stage 41 is coupled to the level shifting stage 43 and by an external capacitor 42 to circuit ground while the output of the second buffer amplifier stage 41 is applied to a peak detector means 49 which detects the positive peaks of the detected chrominance envelope. The peak detector means 49 has an output connected to a memory means 51 in the form of a resistor 53 shunting a capacitor 55 and coupled to circuit ground and to a voltage comparator means 57.

The voltage comparator means 57 is also coupled to the source of regulated reference potential 29 and provides a differential output potential to an external buffer amplifier stage 59. The external buffer amplifier stage 59 couples the output potential from the comparator means 57 to the first chrominance amplifier stage 23 of the signal receiver to regulate the gain thereof such that the chrominance signal applied to the demodulator means 25 remains substantially constant and representative of the peak chrominance signal information.

A peak detector sensing means 61 is also coupled to the peak detector means 49 and in response to chrominance signals decreasing in magnitude controls a first gating means 63. The first gating means 63 provides an output signal to an external timing circuit 65 by allowing capacitor 67 to charge through resistor 69. This external timing circuit 65 has the capacitor 67 connected to circuit ground and a resistor 69 connected to the power source 31. This same output from the external timing circuit 65 is also applied to a second voltage comparator means 71.

The second voltage comparator means 71 is coupled to the source of regulated reference potential 29 and provides an output potential which is applied to and serves to control a second gating means 73. The second gating means 73 is coupled to the junction of the peak detector means 49 and first voltage comparator means 57 and serves to decrease the discharge time of the memory means 51 in response to a decrease in chrominance signal.

Further, a noise detecting means 75 is coupled to the input of the luminance channel 15 and to the source of regulated reference potential 29. Moreover, the noise detecting means 75 has an output coupled to the input of second buffer amplifier stage 41 and serves to inhibit noise signals from altering the results obtainable from the peak detector means 49.

Also, a vertical interval test signal means 77 is coupled to the input of second buffer amplifier stage 41 and by way of an external diode 79 to the high voltage, synchronizing and deflecting means 27 of the television receiver. Moreover, the junction of the VITS means 77 and diode 79 is externally connected to the junction of a resistor 81 coupled to a potential source B+ and a capacitor 83 coupled to circuit ground.

Additionally, a gated automatic tint control means 84 is coupled to the source of regulated reference voltage 29 by way of a terminal $V_1$. Also, the gated automatic tint control means 84 is connected to the high voltage, synchronization and deflection means 27 and cathode ray tube 17 and to the demodulator means 25.

Figure 2B:
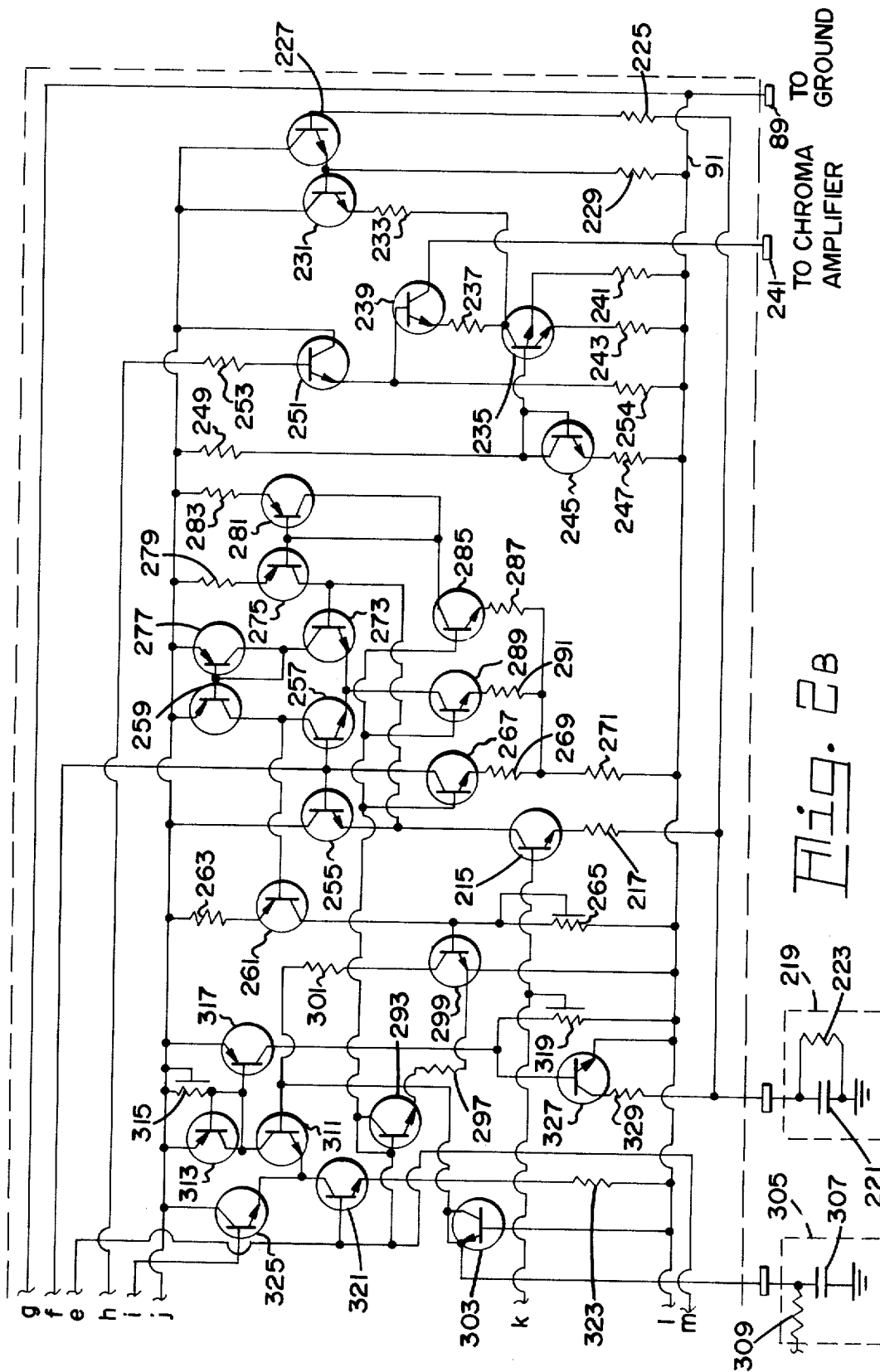
Figure 2C:
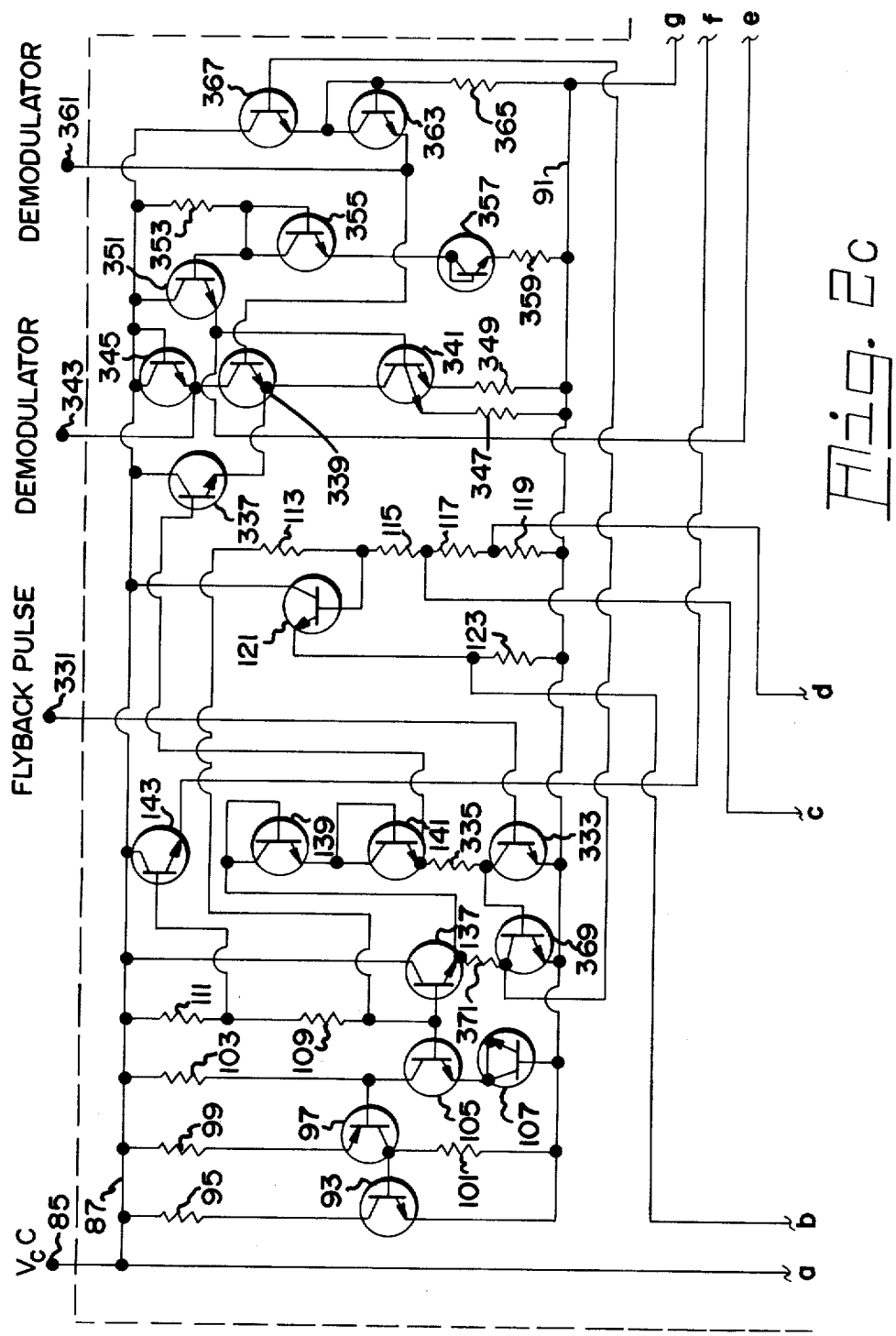

More specifically, FIGS. 2A, 2B, and 2C illustrate an automatic peak color control circuit disposed on a monolithic semiconductor chip to provide an integrated circuit. Also, the preferred embodiment includes a gated automatic tint control circuit in integrated form. Moreover, the gated automatic tint control circuit provides a substantially similar result as the discrete component circuitry set forth in the above-mentioned application bearing U.S. Ser. No. 381,251.

In the FIGS. 2A, 2B, and 2C, a positive DC potential is provided at a potential terminal 85 and distributed within the circuitry by a conductor line 87. Also, circuit ground or a potential reference level appears at the ground terminal 89 and is represented within the integrated circuitry by a grounded line 91.

Potential regulation, reference, and bias potential means provides the desired regulated reference and bias potentials and includes a transistor 93 having a collector coupled by a resistor 95 to the conductor line 87, an emitter connected to the ground line 91, and a base coupled to a transistor 97. The transistor 97 has an emitter coupled by a resistor 99 to the conductor line 87, a collector coupled to the base of the transistor 93 and by a resistor 101 to the ground line 91, and a base coupled to the junction of a resistor 103 connected to the conductor line 87 and to the collector of a transistor 105.

The emitter of the transistor 105 is coupled by a diode-connected transistor 107 to the ground line 91 while the base is coupled by series connected resistors 109 and 111 to the conductor line 87. Also, the base of the transistor 105 is coupled by first, second, third, and fourth series connected resistors 113, 115, 117, and 119 to the ground terminal 91. The junction of the first and second resistors 113 and 115 is coupled to the base of a transistor 121 having a collector connected to the conductor line 87 and an emitter coupled to the ground line 91 by a resistor 123. A junction of the transistor 121 and resistor 123 is connected to a bias means in the form of five diode connected transistors, 125, 127, 129, 131, and 133 series connected by a resistor 135 to the conductor line 87.

Also, the base of the transistor 105 is connected to the base of a transistor 137 having a collector connected to conductor line 87 and an emitter connected to a pair of series connected transistors 139 and 141. Another transistor 143 has a base connected to the junction of the series connected resistors 109 and 111 and a collector connected to the conductor line 87. Thus, a plurality of reference and bias potentials are provided.

As to the remainder of the automatic peak color control circuitry, a signal available from a chrominance amplifier stage of the signal receiver is applied to a chrominance input terminal 145. The input terminal 145 is connected to a chrominance signal amplifier means having a transistor 147 with a base coupled to the chrominance signal terminal 145, an emitter coupled by a resistor 149 to the ground line 91 and a collector coupled to a tuned load formed by an inductance 150 and capacitor 152 coupled to a capacitor 151 and parallel connected to a potential source B+ all located external to the semiconductor chip.

The externally located capacitor 151 is coupled to an envelope detector means in the form of a transistor 153 having a base coupled to the capacitor 151 and by a resistor 155 to the base and collector of a diode 133 of the bias means. The collector of the transistor 153 is connected to the conductor line 87 and the emitter is connected via a resistor 157 and an externally located capacitor 159 coupled to circuit ground. The junction of the resistor 157 and externally located capacitor 159 is coupled by a resistor 161 to the diode 131 of the bias means and to a first buffer amplifier stage 163.

The first buffer amplifier stage is in the form of a transistor 163 having a base coupled to the junction of the resistors 157 and 161 and a collector connected to the conductor line 87. The emitter of the transistor 163 of the first buffer amplifier stage is connected by a resistor 165 to the base of a transistor 167 serving as a second buffer amplifier stage. The transistor 167 of the second buffer amplifier stage has a base coupled to a potential level shifting means including the collector of a transistor 169 having an emitter connected by a resistor 171 to the ground line 91 and to another resistor 173 connected to the emitter of another transistor 175. The base and collector of the diode-connected transistor 175 are connected to the base of the transistor 169 and to a color control in the form of an adjustable arm 177 of an alterable resistor 179 intermediate a potential source B+ and circuit ground.

The base of the transistor 167 or second buffer amplifier stage is also coupled to a noise gating means. The noise gating means includes a luminance signal input terminal 181 connected to a diode 183 coupled to the base of a transistor 185. The collector of the transistor 185 is coupled via a resistor 187 to the ground line 91 and to the base of a transistor 189. The emitter of the transistor 189 is connected to the ground line 91 while the collector is coupled by an external capacitor 191 to circuit ground and to the base of the transistor 167 of the second buffer amplifier stage. The emitter of the transistor 185 is connected to the emitter of a transistor 193 having a base coupled to the junction of the series connected resistors 117 and 119 of the bias means and a collector connected to the ground line 91. The junction of the transistors 185 and 193 is connected via a resistor 195 to the emitter of a transistor 197 having a base connected to the diode 129 of the bias means and a collector coupled to the conductor line 87.

Further, a vertical interval test signal gating means (VITS) has an input terminal 199 connected to the emitter and collector of a diode-connected transistor 201. The base of the transistor 201 is connected by a resistor 203 to the ground line 91 and to the base of a transistor 205. The transistor 205 has an emitter connected to the ground line 91 and a collector coupled by a resistor 207 to the emitter of a transistor 209 with a collector connected to the conductor line 87 and a base coupled to the junction of the resistors 115 and 117 of the reference potential source. The collector of the transistor 205 is also connected to the base of a transistor 211 having an emitter connected to the ground line 91 and a collector coupled to the base of the transistor 167 of the second buffer amplifier means.

The emitter of the transistor 167 of the second buffer amplifier means is coupled to the ground line 91 by a resistor 213. Also, the emitter of the transistor 167 is coupled to a peak detector means which includes a transistor 215. The base of the transistor 215 of the peak detector means is coupled to the emitter of the transistor 167 of the second buffer amplifier means while the emitter is coupled by a resistor 217 to a memory means 219 including a capacitor 221 shunted by a resistor 223 and connected to circuit ground. The resistor 217 connected to the emitter of the peak detector transistor 215 is also coupled via a resistor 225 to a first voltage comparator means including the base of a transistor 227.

The transistor 227 of the first voltage comparator means has a collector connected to the conductor line 87 and an emitter connected by a resistor 229 to the ground line 91. The emitter of the transistor 227 is also connected to the base of a transistor 231 having a collector connected to the conductor line 87 and an emitter coupled by a resistor 233 to the collector of a dual emitter transistor 235 and via a resistor 237 to the emitter of a transistor 239. The dual emitter transistor 235 has first and second emitters coupled by resistors 241 and 243 to the ground line 91. The base is connected to a diode-coupled transistor 245 having an emitter coupled by a resistor 247 to the ground line 91 and the collector and base coupled by a resistor 249 to the conductor line 87.

The first voltage comparator means includes another transistor 251 having a base coupled by a resistor 253 to the junction of the series connected resistors 115 and 117 of the potential regulation, reference, and bias potential means. The collector of the transistor 251 is connected to the conductor line 87 while the emitter is coupled to the ground line 91 by a resistor 254 and to the base of the transistor 239. The collector of the transistor 239 is connected to an external terminal 241 which is, in turn, coupled via a buffer amplifier stage, 59 of FIG. 1 to the chrominance amplifier stage 23 of FIG. 1.

Referring back to the transistor 215 of the peak detector means, a peak detector sensing means for determining a decreasing chrominance signal includes a peak detector sensing stage, first and second gating means and a second voltage comparator means. The peak detector sensing stage includes a transistor 255 having an emitter connected to the collector of the transistor 215 of the peak detector means and a collector connected to the conductor line 87. The base of the transistor 255 is connected to the emitter of the transistor 143 of the potential regulation, reference, and bias potential means.

Also, the base of the transistor 255 is connected to the base of a transistor 257 having a collector connected to the collector of a transistor 259 whose emitter is connected to the conductor line 87. The collector of the transistor 257 is also connected to the base of a transistor 261 having an emitter connected by a resistor 263 to the conductor line 87 and a collector coupled by a resistor 265 to the ground line 91. The junction of the transistors 255 and 257 is connected to the collector of a transistor 267 having an emitter connected by series connected resistors, 269 and 271 respectively, to the ground line 91.

The junction of the interconnected transistors, 215 and 255 respectively, is coupled to the base of a transistor 273 and to the collector of a transistor 275. The collector of the transistor 273 is connected to the base and collector of a transistor 277 having an emitter connected to the conductor line 87. The transistor 275 has an emitter coupled via a resistor 279 to the conductor line 87 and a base connected to the base and collector of a transistor 281 with an emitter coupled by a resistor 283 to the conductor line 87.

The base and collector of the transistor 281 is connected to the collector of a transistor 285 having an emitter coupled by a resistor 287 to the junction of the series connected resistors 269 and 271. Also, the junction of the transistors 257 and 273 is coupled to the collector of a transistor 289 having an emitter coupled by a resistor 291 to the junction of the resistors 269, 271, and 287. Moreover, the bases of the transistors 285, 267 and 289 are coupled to the collector and base of a transistor 293 serving as a portion of the bias developing means and having the base coupled by a resistor 295 to the base of the transistor 147 of the chrominance signal amplifier means.

The emitter of the transistor 293 is connected via a resistor 297 to the ground line 91 and to the emitter of a transistor 299 forming a portion of a first gating means. The base of the transistor 299 is coupled to the collector of the transistor 261 and to the ground line 91 by a resistor 265 while the collector is coupled by a resistor 301 to the collector and emitter of a transistor 303. The base of the transistor 303 is connected to the ground line 91 while the emitter is coupled to an external timing circuit 305 which includes a capacitor 307 connected to circuit ground and a resistor 309 connected to the potential terminal 85.

The transistor 299 of the first gating means is also connected via the resistor 301 to the base of a transistor 311 forming a portion of a second voltage comparator means of the sensing means. The transistor 311 has a collector coupled to the base and collector of a diode-connected transistor 313 having an emitter connected to the conductor line 87 and the collector and base coupled by a resistor 315 to the conductor line 87. The base and collector of the transistor 313 are also connected to the base of a transistor 317 having an emitter connected to the conductor line 87 and a collector coupled by a resistor 319 to the ground line 91.

The emitter of the transistor 311 of the second voltage comparator means is also coupled to the collector of a transistor 321 having an emitter coupled to the ground line 91 by a resistor 323 and a base coupled to the bias resistor 295 of the transistor 147 of the chrominance amplifier stage. The emitter of the transistor 311 is coupled to the emitter of a transistor 325 having a collector connected to the conductor line 87 and a base connected to the emitter of a transistor 197 of the regulated bias potential means.

Further, a second gating means of the sensing means includes a transistor 327 having a base connected to the collector of a transistor 317, an emitter connected to the ground line 91, and a collector coupled by a resistor 329 to a terminal connected to the memory means 219. Moreover, the resistor 329 is also connected to resistor 217 which is, in turn, connected to the emitter of the peak detector means or transistor 215.

Additionally, a gated automatic tint control circuit, providing results similar to the discrete component circuitry disclosed in the previously mentioned copending application, includes an external terminal 331 connected to a source of flyback pulse signals such as the high voltage, synchronization, and deflection means 27 of FIG. 1. A transistor 333 has a base coupled to the external terminal 331 with an emitter connected to the ground line 91 and a collector coupled by a resistor 335 to the emitter of a transistor 141 and to the base of a transistor 337.

The transistor 337 has a collector connected to the conductor line 87 and an emitter connected to the emitter of a transistor 339 and the collector of a dual-emitter transistor 341. The collector of the transistor 339 is connected to an external terminal 343 for providing a reference potential to a demodulator stage, 25 of FIG. 1, and to the emitter of a diode-connected transistor 345 having a collector and base coupled to the conductor line 87. The dual-emitter transistor 341 has first and second emitters coupled by first and second resistors 347 and 349 to the ground line 91. The base of the dual-emitter transistor 341 is coupled to the bases of transistors, 321 and 293 respectively, and to the resistor 295 at the base of the transistor 147 of the chroma amplifier stage.

The base of the dual-emitter transistor 341 is also connected to the emitter of a transistor 351 having a collector connected to the conductor line 87. The base of transistor 351 is connected to conductor line 87 via a resistor 353 and to the base and collector of a transistor 355. The emitter of the transistor 355 is coupled to the base and collector of a transistor 357 having an emitter coupled by a resistor 359 to the ground line 91.

The base of the transistor 339 is connected to an external terminal 361 coupled to the demodulator stage, 25 of FIG. 1, and to the emitter of a transistor 363. The collector and base of the transistor 363 are connected to the ground line 91 via a resistor 365 and to the emitter of a transistor 367. The collector of the transistor 367 is connected to the conductor line 87 while the base is coupled to the collector of a transistor 369 with the collector connected via a resistor 371 to the emitter of the transistor 137 and the collector and base of the transistor 139. Moreover, the base of the transistor 369 is connected to the collector of the transistor 333 and to the resistor 335.

Thus, the circuitry illustrated in block form in FIG. 1 is implemented in integrated form in the embodiment of FIG. 2. Moreover, the automatic peak color control circuitry as well as noise protection, VITS circuitry, and gated automatic tint control circuitry have been included on a single semiconductor chip in a preferred embodiment.

As to operation, the block diagram of FIG. 1 will serve as a basis for general discussion of a preferred form of automatic peak color control circuitry. Therein, an integrated circuit is disposed on a semiconductor chip and includes a regulated reference voltage and bias potential means 29 connected to an external source of power 31 such as a 24 volt power supply for example.

A chroma signal available from the first chrominance amplifier stage 23 of the television receiver is applied to a chrominance signal amplifier stage 33. This amplifier stage 33 is of the fixed gain type and couples the amplified chrominance signal by way of a capacitor 37, external to the semiconductor chip, to an envelope detector stage 35. The envelope detector stage 35 is also coupled to the regulated reference voltage source 29 and is of a design such that a detected signal is delayed and the high frequency components of the signal are filtered by means of an external filter capacitor 39, to provide a low frequency positive half-envelope of the signal. Thus, a combined DC potential and filtered signal or chroma envelope are applied, via a first buffer amplifier stage 38 to a second buffer amplifier stage 41.

The input of the second buffer amplifier stage 41 is coupled to a level shifting network 43 which is, in turn, connected to the alterable arm 45 of a variable resistor 47 coupled intermediate a potential source B+ and a potential reference level and located external to the semiconductor chip. The level shifting network 43 is a color preferance control and is adjusted to provide a potential of a polarity opposite to the polarity of the DC potential available from a first buffer amplifier stage 38 coupled to the envelope detector stage 35. The magnitude of the DC potential available from the level shifting network 43 is selected to provide application of a desired DC potential to a peak detector 49 and a desired level of chroma signal to the demodulator 25.

Thus, the level shifting network 43, in effect, cancels a portion of the DC potential applied to the envelope detector stage 35 such that the combined chroma signal and DC potential magnitude available from the second buffer amplifier stage 41 is of a magnitude substantially equal to the magnitude of the DC potential applied to the envelope detector stage 35.

This combined chroma signal and DC potential is applied to a peak detector stage 49 having a memory means 51, external to the semiconductor chip, and including a parallel connected resistor 53 and capacitor 55 coupled to circuit ground. The peak detector stage 49 develops a DC potential at the memory means 51 representative of the peak magnitude of the chroma signal and this developed DC potential is applied to a voltage comparator circuit 57.

The voltage comparator circuit 57 is of the high gain type, a voltage gain of 50 for example, and receives a DC reference potential from the regulated reference voltage source 29. Also, a DC potential representative of the peak potential of the chroma signal and available from the peak detector stage 49 is applied to the voltage comparator circuit 57. Since the voltage comparator circuit 57 is of the high gain type, a slight differential in the potential available from the peak detector stage 49 and from the regulated reference voltage source 29 causes development of a relatively large correction potential from the voltage comparator circuit 57. In turn, this correction potential is applied by way of a buffer amplifier stage 59 to the first chroma amplifier stage 23 whereby the gain of the first chroma amplifier stage 23 is controlled and the level of the chroma signal applied to the demodulator stages 25 remains substantially constant. Moreover, the substantially constant chroma signal level is of a magnitude determined by the setting of the level shifting network 43.

Figure 3A:
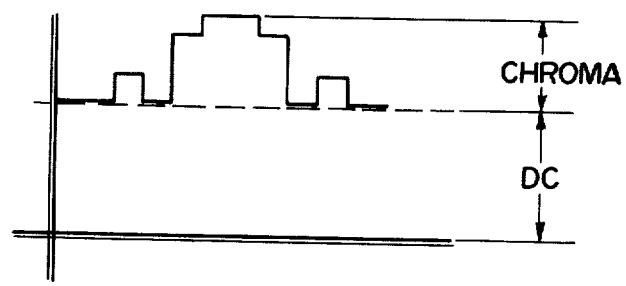
FIGS. 3A, 3B, and 3C illustrate output potentials available from an envelope detector, level shifting means, and peak detector means respectively
Figure 3B:
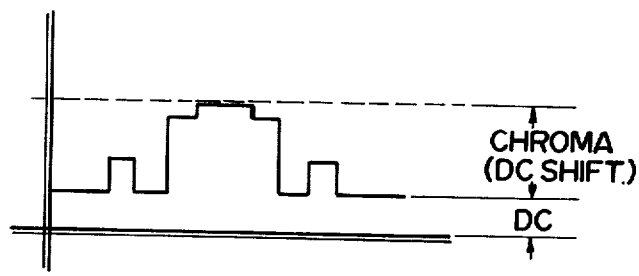
Figure 3C:
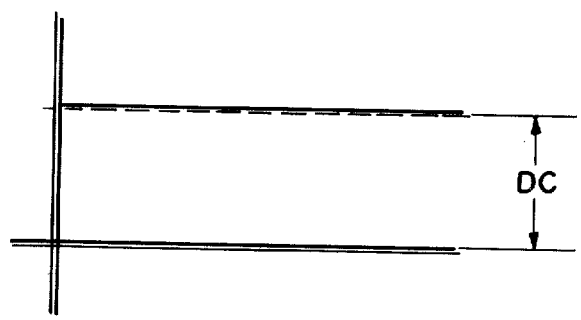

For purposes of illustration, FIG. 3A depicts the combined DC potential and detected chroma signal available from the envelope detector. FIG. 3B illustrates the combined DC potential and detected chroma signal after having been treated by the level shifting network 43. As can be seen, the DC potential provided by the level shifting network 43 is of a magnitude such that the combined chroma signal and DC potential applied to the peak detector stage 49 is substantially equal to the DC potential applied to the envelope detector stage 35. Also, FIG. 3C illustrates the DC potential available from the peak detector stage 49 and appropriate for application to the voltage comparator circuit 57. Thus, the deviation in the potentials from the peak detector stage 49 and from the regulated reference potential source 29 as compiled by the voltage comparator circuit 57 is employed to maintain the chroma signal applied to the demodulator stages 25 of the signal receiver substantially constant.

Further, a steady-state condition for scenes having maximum chroma peaks at regular intervals provides a given charge at the memory capacitor means 51 of the peak detector stage 49 whereupon a given potential is applied to the voltage comparator circuit 57 and to the signal receiver. In the event of a sudden increase in the chroma signal, the memory capacitor means 51 will charge to a higher value which will be applied to the voltage comparator circuit 57 and to the signal receiver to effect correction compensation for the increase in signal and maintain a substantially constant level of chroma at the demodulator stages 25.

However, a sudden decrease in the chroma signal causes the peak detector stage 49 to discontinue conduction due to the charge on the memory capacitor means 51 of the output exceeding the potential of the input. Thereupon, the peak detector sensing stage 61 of a peak detector sensing means causes a first gating means 63 to open whereupon a timing capacitor 67 of an external timing circuit 65 which is coupled to the power source 31 begins to charge.

The timing capacitor 67 charges until a threshold value of a second voltage comparator stage 71 is attained. The second voltage comparator stage 71 is then rendered conductive to effect closing of the second gating means 73. Upon closing of the second gating means 73, the memory capacitor 55 is discharged to a level whereat the peak detector stage 49 is again conductive. Thereupon, the first gating means 63 closes, the timing capacitor 67 is discharged to circuit ground, the voltage on the second voltage comparator stage 71 decreases to a value less than the threshold value, the second gating means 73 is opened, and charging of the memory capacitor 55 is again controlled by the peak detector stage 49.

Still further, a noise detector stage 75 receives a video signal from the luminance channel 15 and a threshold potential from the regulated reference voltage source 29. The DC portion of the video signal is adjustable whereby the back porch level of the video signal is set to the value of the threshold potential. Thus, signals above the threshold level, such as random noise signals, activate the noise detector stage 75 in a manner such that the second buffer amplifier stage 41 is inactivated and the noise signals do not arrive at the peak detector stage 49.

Additionally, it may be noted that the peak detector stage 49 with a memory means 51 has a very short charge time as compared with the discharge time. It can be seen that any chroma peak potential would tend to modify the peak detector stage 49 rendering any subsequent chroma peaks below this level ineffective.

Thus, it is apparent that discretion must be used in the allowance of peak chroma signals applied to the peak detector stage 49.

Many stations and networks utilize horizontal scan lines 18 and 19 for testing TV transmission capabilities and features. These test signals are not part of the regular program and are, therefore, of various kinds and magnitudes. Thus, the test signals are "gated" or prohibited from reaching the peak detector stage 49 by a vertical interval test signal gate means 77.

More specifically, a vertical blanking pulse signal is ordinarily about ten (10) lines wide and starts at the fifth line. Thus, we need a blanking pulse of at least sixteen (16) lines duration in order to obtain the desired blanking of the horizontal lines 18 and 19 which means that the vertical pulse must, in essence, be "stretched".

To effect the above-mentioned "stretching" of the vertical pulse signal, the syncronizing, high voltage, and deflection circuitry 27 provides a vertical pulse signal which is applied via a diode 79 to a VITS gate circuit 77. This vertical pulse signal is also applied to a charging network including a resistor 81 and capacitor 83 coupled intermediate a potential source B+ and ground.

The vertical pulse signal causes conduction of the diode 79 and discharge of the capacitor 83. Upon discontinuance of the vertical pulse signal, the diode 79 stops conducting and the capacitor 83 charges to a threshold value of the VITS gate circuit 77. Thus, the VITS gate circuit 77 prohibits any chroma signal from reaching the peak detector stage 49 for a period approximating sixteen (16) horizontal scan lines and the desired testing on horizontal scan lines 18 and 19 may be effected without detriment to the signal receiving capabilities of the TV receiver.

As to the embodiment of FIGS. 2A, 2B, and 2C, a chrominance signal is applied to a terminal 145 connected to the base of a transistor 147. The transistor 147 amplifies the chroma signal and applies the amplified signal by way of an external capacitor 151 to a transistor 153 of the envelope detector means.

The transistor 153 detects the chrominance signal and provides a filtered chroma envelope which is applied to a transistor 163 of a first buffer amplifier stage and is, in turn, coupled by a resistor 165 to a transistor 167 of a second buffer amplifier stage. Also, a DC potential available from a regulated reference potential source via transistor 131 and a resistor 161 is applied to the transistor 163 of the first buffer amplifier stage.

A potential level shifting network including a color control resistor 179 coupled intermediate a potential source B+ and ground is adjusted to provide a DC potential in an amount proportional to a desired level of chroma envelope and of opposite polarity. This DC potential is applied via transistors 169 and 175 to the second buffer amplifier stage 167. In turn, a DC output potential and chroma envelope from the transistor 167 of the second buffer amplifier means is applied to a transistor 215 of a peak detector means.

The transistor 215 of the peak detector means provides a DC output which is applied to first voltage comparator means which includes resistor 225, transistor 227, transistor 231, and via resistor 233 to dual emitter transistor 235. Also, a reference potential available from the junction of the resistors 115 and 117 is applied to the voltage comparator means via transistor 251 and transistor 239. In turn, the transistor 239 provides an output control signal at a terminal 241 which is coupled back to and maintains a substantially constant level of chroma signal in the television receiver.

Further, compensation for a decreasing peak chroma signal level is provided by a peak detector sensing means wherein the output from the transistor 215 of the peak detector means is coupled to a transistor 255, a transistor 257, a transistor 273, and a transistor 275. Upon non-conduction of the transistor 215 of the peak detector means, current is provided by transistor 275, a constant current source, to the transistor 273 whereupon transistors 259 and 277 are turned on. Therefore, current for the transistor 257 will be flowing through the transistor 259 whereupon the transistor 261 will be turned off. In turn, transistor 299, which is coupled to C307 via resistor 301 and transistor 303, will turn off permitting the timing capacitor C307 to start charging.

Charging of the capacitor C307 causes an increasing potential at the base of the transistor 311. In a certain time period, the base of the transistor 311 will reach the potential of the base of the transistor 325 causing conduction of the transistor 311, transistor 313, transistor 317, and transistor 327. Upon conduction of transistor 327, the charge on the memory capacitor 221 is reduced lowering the emitter voltage of the transistor 215 or peak detector means until the transistor 215 is again rendered conductive.

Upon conduction of the peak detector transistor 215, current will be provided by the current source, transistor 275. Thereupon, current will be diverted from the transistor 273 and it will turn off, turning off transistor 277 and transistor 259. As a result, transistor 261 and transistor 299 will be turned on which discharges the timing capacitor C307 to circuit ground or to a very low potential level. Thus, the voltage at the base of transistor 311 is reduced below the voltage at the base of the transistor 325 turning off transistor 311, transistor 313, transistor 317, and transistor 327. Therefore, the memory capacitor C221 no longer has a discharge path and remains at this level until further energization from the peak detector means.

Also, the noise gate circuitry receives a luminance signal at an input terminal 181 from the luminance channel which is applied via a diode 183 to a transistor 185 coupled to a transistor 193. The transistor 193 receives a reference potential from the junction of a pair of resistors 117 and 119 of the regulated reference potential source. When the potential at the transistor 185 exceeds the threshold potential at the transistor 193, a transistor 189 is turned on which turns off a transistor 167 of the second buffer amplifier means whereupon noise signals are prevented from reaching the peak detector means which includes transistor 215. Thus, noise signals do not reach the peak detector means nor have any deleterious effects thereon.

In a somewhat similar fashion, a vertical pulse signal is applied to a VITS input gate terminal 199, which is normally connected to an external charge circuit as previously explained. This vertical pulse signal is "stretched" employing the charge circuit until the threshold level of a transistor 205 is reached whereupon the transistor 205 is rendered conductive until the next vertical pulse signal occurs. Thus, the transistor 205 is off for about 1.12 milliseconds which turns transistor 211 on for the same period. In turn, conduction of this transistor 211 renders the transistor 167 of the second buffer amplifier means non-conductive for the same period preventing undesired test signals from reaching the peak detector means including transistor 215.

Thus, there has been provided a unique automatic peak color control circuit for a television receiver. The circuitry maintains a substantially constant level of chroma signal for a display device despite variations in the ratio of color burst to chroma signal. Also, the circuitry includes a noise immunization circuit whereby undesired random noise deleterious to the circuitry operation is rendered ineffective. Further, apparatus for preventing undesired alterations in the viewable signals which may be caused by station and network test signals is also provided.

Moreover, the circuitry is particularly adapted to integrated form on a semiconductor chip.

While there has been shown and described what is at present considered the preferred embodiment of the invention, it will be obvious to those skilled in the art that various changes and modifications may be made therein without departing from the scope of the invention as defined by the appended claims.

What is claimed is:

1. In a color television receiver having a luminance channel, a power source, high voltage, synchronization and deflection means and a first chrominance amplifier stage providing a chrominance output signal to a chrominance demodulation stage, an automatic peak color control circuit comprising:

a source of regulated reference potential coupled to said power source;

chrominance signal amplifier means coupled to said source and said chrominance amplifier stage of said receiver;

a potential level shifting means coupled to an adjustable potential source for providing a DC potential of a polarity opposite and in an amount substantially proportional to a maximum chroma signal derived from said chrominance signal amplifier means;

envelope detector means coupled to said chrominance signal amplifier means and to said source of regulated reference potential for providing a filtered low frequency half-envelope chroma signal;

peak detector means coupled to said potential level shifting means and to said envelope detector means for providing a DC potential representative of the peak magnitude of the chroma signal; and voltage comparator means coupled to said source of regulated reference potential and to said peak detector means and responsive to a potential differential therebetween for providing a control signal to effect alterations in gain of said first chrominance amplifier stage whereby a chrominance signal of substantially constant magnitude is applied to said chrominance demodulator stage.

2. The automatic peak color control circuit of claim 1 including a buffer amplifier stage coupling said envelope detector means and potential level shifting means to said peak detector means.

3. The automatic peak color control circuit of claim 1 including a noise detecting means coupled to said luminance channel, said source of regulated reference potential, and to a junction of said envelope and peak detector means, said noise detecting means comparing a signal from said luminance channel and a DC signal to effect cancellation of noise signals in said chrominance signal for application to said peak detector means.

4. The automatic peak color control circuit of claim 1 including a vertical interval test signal gating means coupled to said high voltage, synchronization and deflection means and to a junction of said envelope and peak detector means for inhibiting chroma signals from reaching said peak detector means during a specified reciever testing period.

5. The automatic peak color control circuit of claim 4 wherein said vertical interval test signal gating means includes a diode coupling said means to said high voltage, synchronizing and deflection means.

6. The automatic color control circuit of claim 1 wherein said peak detector means includes a memory means in the form of a resistor shunted capacitor coupled to said voltage comparator means and to circuit ground for developing a DC potential representative of the peak magnitude of the chroma signal.

7. The automatic peak color control circuit of claim 1 including a memory means coupled to said peak detector and first voltage comparator means, a peak detector sensing means coupled to said peak detector and to a timing circuit and a second voltage comparator means with said second voltage comparator means coupled to said memory means and said peak detector and first voltage comparator means whereby a decrease in chroma signal causes discontinuance of conduction of said peak detector, activation of said peak detector sensing means to effect charging of said timing circuit to cause conduction of said second voltage comparator circuit, discharge of said memory means and conductivity of said peak detector.

8. The automatic peak color control circuit of claim 7 wherein said timing circuit in the form of a capacitor coupled to a potential reference level with a resistor coupling said capacitor to said power source for effecting a charge on said capacitor in response to a decrease in chroma signal level whereby the conductivity of said peak detector means is altered.

9. An automatic peak color control circuit for a color television receiver having a first chrominance amplifier stage coupled to a chrominance demodulator stage, a luminance signal channel, a power source, and a high voltage, synchronization and deflection means comprising:

a source of regulated reference potential coupled to said power source;

chrominance signal amplifier means coupled to said reference potential source and to the output of said first chrominance amplifier stage;

envelope detector means coupled to said reference potential source and to the output of said chrominance signal amplifier means for providing a combined DC potential and filtered chroma signal;

an adjustable potential source;

a potential level shifting means coupled to said adjustable potential source and to said envelope detector means to effect cancellation by said adjustable potential source of a DC potential in an amount to provide a combined DC potential and chroma signal having a magnitude substantially equal to the magnitude of the DC potential applied to said envelope detector means;

peak detector means coupled to said potential level shifting means for providing a DC potential representative of the magnitude of the chroma signal; and a voltage comparator means coupled to said source of regulated reference potential and said peak detector means and providing a control signal for application to said first chrominance amplifier stage of said receiver to control the gain thereof.

10. The automatic peak color control circuit of claim 9 wherein said circuit is of integrated form or a monolithic semiconductor device or chip.

11. The automatic peak color control circuit of claim 10 wherein said peak detector means includes a memory means in the form of a resistor shunted capacitor external to said semiconductor chip and coupled to a potential reference level.

12. The automatic peak color control circuit of claim 10 including a peak chrominance signal sensing means coupled to said peak detector means, to a seconod voltage comparator means connected to said source of regulated reference potential, said peak chrominance signal sensing means including a timing circuit external to said semi-conductor chip with said timing circuit having a capacitor coupled to circuit ground, to said second voltage comparator means, and to a resistor connected to said power source whereby a sudden decrease in chroma signal magnitude causes said timing circuit to prepare said peak detector stage for activation by said chroma signal of reduced magnitude.

13. The automatic peak color control circuit of claim 9 including a noise detection means coupled to said regulated reference potential, said luminance signal channel and said peak detector means, said noise detection means responding to noise signals in said luminance signal of a magnitude greater than said regulated reference potential to effect inactivation of said peak detector means.

14. The automatic peak color control circuit of claim 9 including a peak chrominance signal sensing means having a peak detector sensing stage coupled to said peak detector means and a second voltage comparator means coupled to said peak detector sensing stage and said source of regulated reference potential, said second voltage comparator means coupled to said peak detector means means for effecting alterations in the output thereof and the gain of said first chrominance amplifier stage of said receiver in accordance with the decreasing peak chrominance signals as determined by said peak detector sensing stage.

15. In a color television receiver having a reference potential means; a luminance channel; high voltage, synchronization and deflection signal means; and a chrominance channel with a first chrominance amplifier stage providing an output chrominance signal, an automatic peak color control circuit comprising:

means coupled to said reference potential means and to said chrominance amplifier stage for detecting the envelope of said chrominance signal and providing a combined DC potential and chroma signal envelope;

means coupled to an adjustable DC potential source and to said combined DC potential and chrominance signal envelope for effecting cancellation of a portion of said DC potential and shifting the potential level of said combined DC potential and chroma signal envelope;

means coupled to said shifted potential level combined DC potential and chroma signal envelope for detecting the peak magnitude of said chroma signal envelope; and means coupled to said detected peak magnitude of said chroma signal envelope and reference potential means for comparing said potentials and providing a control signal for altering the gain of said chrominance channel to provide a substantially constant level of output potential.

16. The automatic peak color control circuit of claim 15 including a noise gating means coupled to said luminance channel and said reference potential for preventing noise signals above a given threshold in a level shifted DC potential and chroma signal from reaching said means for detecting the peak magnitude of said chroma signal envelope.

17. The automatic peak color control circuit of claim 15 including a vertical interval test signal gating means coupled to a vertical pulse source and to said peak detector means rendering said peak detector means inoperative during a period of test signal usage.

18. The automatic peak color control circuit of claim 15 including means for sensing a decrease in said chroma signal magnitude and reducing the charge potential of a memory capacitor means of said peak detector means to a value whereat said peak detector means controls said voltage comparator means and the gain of said chrominance channel.

19. In a color television receiver having a luminance channel, a power source, high voltage, synchronization and deflection means, and a first chrominance amplifier stage providing a chrominance output signal to a chrominance demodulator stage, an automatic peak color control circuit comprising:

a reference potential source coupled to said power source;

chrominance signal amplifier means coupled to said first chrominance amplifier stage and said reference potential source;

noise detector means coupled to said luminance channel and to said reference potential source for detecting noise signals above a threshold level as determined by said potential source;

peak detector means coupled to said chrominance output signal and to said noise detector means and providing an output signal representative of the peak magnitude of the chrominance output signal in the absence of noise signals above said given threshold level is determined by said potential source; and voltage comparator means coupled to said peak detector means and to said reference potential source and responsive to the potential differential therebetween for providing a control signal to effect alterations in gain of said chrominance signal amplifier means whereby a chrominance signal of substantially constant magnitude is applied to said chrominance demodulation stage.

20. The automatic peak color control circuit of claim 19 wherein said peak detector means includes a memory means in the form of a resistor shunted capacitor coupled to said voltage comparator means and to circuit ground.

21. The automatic peak color control circuit of claim 19 including a chrominance signal filtering means coupling said chrominance signal amplifier means to said peak detector means.

22. The automatic peak color control circuit of claim 19 wherein said noise detector means is in the form of a noise gate means rendering said peak detector means inoperative upon receipt of noise signals exceeding a given threshold value.

23. In a color television receiver having a luminance channel, a power source, high voltage, synchronization and deflection means, and a chrominance channel with a first chrominance amplifier stage providing a chrominance output signal, an automatic peak color control circuit comprising:
reference potential source coupled to said power source;
noise detector means coupled to said reference potential source and to said luminance channel for detecting noise signals in said luminance channel above a given DC threshold level;
peak detector means coupled to said chrominance channel and to said noise detector means for providing noise-free signals representative of a maximum level of signal from said chrominance channel; and
voltage comparator means coupled to said reference potential source and said peak detector means, said comparator means providing a differential control signal for effecting a substantially uniform chrominance output signal from said chrominance channel.

24. The automatic peak color control circuit of claim 23 including an envelope detector means coupling said chrominance channel to said peak detector means, said envelope detector means being coupled to said reference potential source to provide a combined DC potential and chroma envelope of a signal from said chrominance channel.

25. The automatic peak color control circuit of claim 23 wherein said peak detector means includes a memory means coupled to a potential reference level for developing a DC potential representative of the peak magnitude of a chroma signal.

26. The automatic peak color control circuit of claim 23 including a peak chrominance signal sensing means coupled to said peak detector means and to a voltage comparator means connected to said reference potential source for sensing a sudden decrease in chrominance signal level and altering said peak detector means to permit response thereof to said reduced level of chrominance signal level.

* * * * *